(12) United States Patent
Dai et al.

(10) Patent No.: US 9,535,584 B2
(45) Date of Patent: Jan. 3, 2017

(54) ENHANCED VISUAL NAVIGATION BREADCRUMBS

(71) Applicant: Oracle International Corporation, Redwood Shores, CA (US)

(72) Inventors: Yi Dai, Winchester, MA (US); Hugh Zhang, Winchester, MA (US); Jairam Ramanathan, Waltham, MA (US); Prashant Singh, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 227 days.

(21) Appl. No.: 14/300,419

(22) Filed: Jun. 10, 2014

(65) Prior Publication Data

US 2015/0355817 A1    Dec. 10, 2015

(51) Int. Cl.
*G06F 3/14*  (2006.01)
*G06F 3/0484*  (2013.01)
*G06F 3/0481*  (2013.01)
*G06F 17/30*  (2006.01)

(52) U.S. Cl.
CPC ......... *G06F 3/04842* (2013.01); *G06F 3/0481* (2013.01); *G06F 17/30873* (2013.01); *G06F 17/30899* (2013.01)

(58) Field of Classification Search
CPC ..................................... G06F 3/14; G06F 3/17
USPC ................................................. 715/854, 863
See application file for complete search history.

(56) References Cited

U.S. PATENT DOCUMENTS

| | | |
|---|---|---|
| 8,316,323 B2 | 11/2012 | Saraiya et al. |
| 8,488,172 B2 | 7/2013 | Hawes et al. |
| 2006/0123361 A1* | 6/2006 | Sorin ................ G06F 17/30873 715/854 |

* cited by examiner

*Primary Examiner* — Ruay Ho
(74) *Attorney, Agent, or Firm* — Miles & Stockbridge P.C.

(57) ABSTRACT

A system that provides visual components generates a first display of selectable and hierarchical visual components, where each visual component has at least one associated attribute. The system receives a selection of one of the visual components and displays a second display of visual components at a next hierarchical level of the selected visual component. The system then generates and displays breadcrumbs that include a navigation path from the first display to the second display, and include the associated attribute for the selected visual component.

17 Claims, 13 Drawing Sheets

ENHANCED VISUAL NAVIGATION BREADCRUMBS

FIELD

One embodiment is directed generally to a computer system, and in particular to a computer system that generates enhanced breadcrumbs for visual navigation.

BACKGROUND INFORMATION

"Breadcrumbs" are a navigation aid that appear in user interfaces. It allows users to keep track of their locations within programs or documents. Breadcrumbs typically appear horizontally across the top of a web page, often below title bars or headers. It provide links back to each previous page the user navigated through to get to the current page or, for hierarchical web page structures, the parent pages of the current one. In general, breadcrumbs provide a trail for the user to follow back to the starting or entry point.

SUMMARY

One embodiment is a system that provides visual components. The system generates a first display of selectable and hierarchical visual components, where each visual component has at least one associated attribute. The system receives a selection of one of the visual components and displays a second display of visual components at a next hierarchical level of the selected visual component. The system then generates and displays breadcrumbs that include a navigation path from the first display to the second display, and include the associated attribute for the selected visual component.

DETAILED DESCRIPTION

One embodiment is a system that generates enhanced breadcrumbs that provide attribute/data/context information for each breadcrumb level in addition to navigation information provided with known breadcrumbs.

Figure 1:
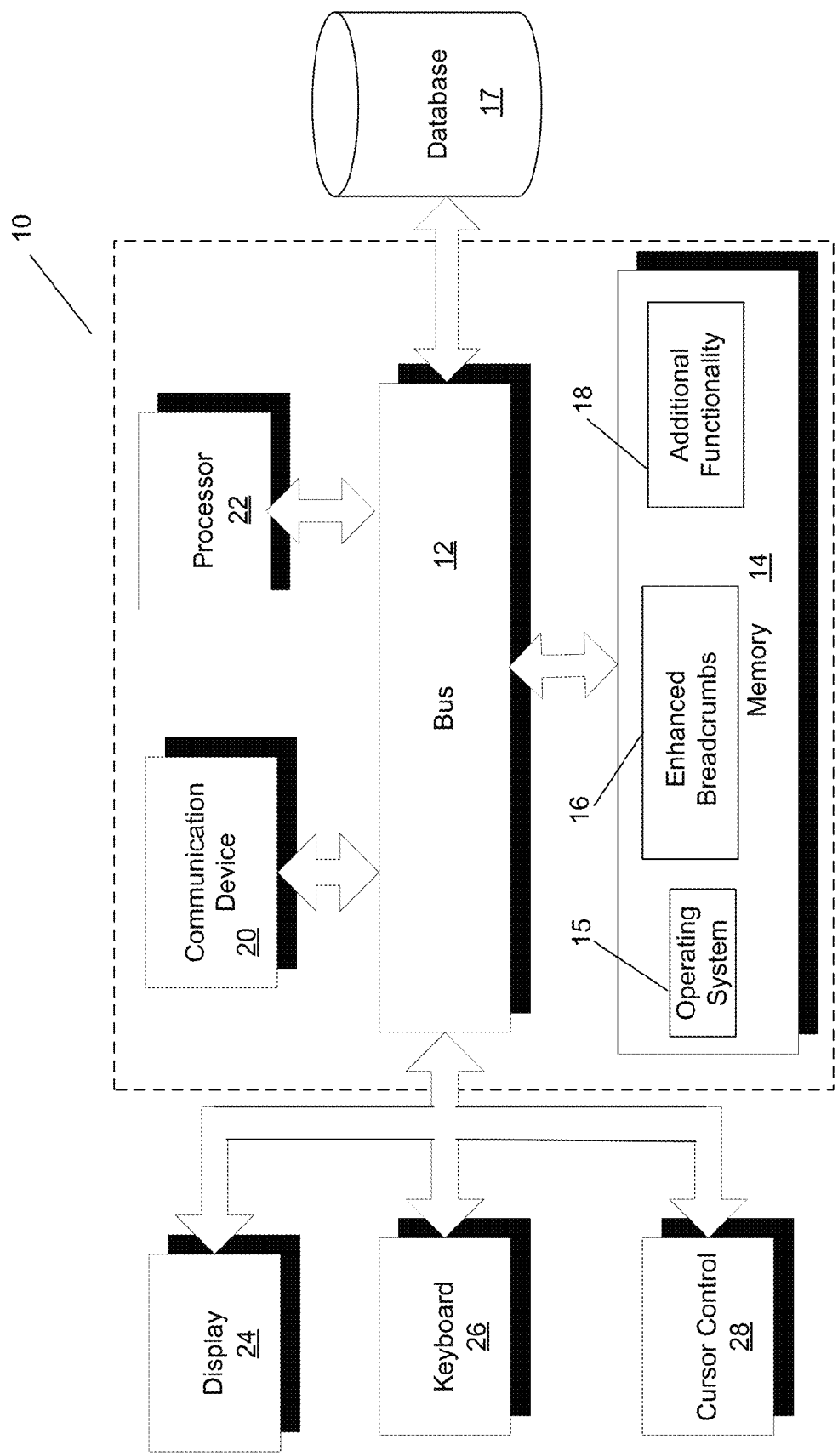
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as a map with enhanced breadcrumbs. Display 24 can be a touchscreen that allows the user to interact using touchscreen gestures, including multi-touch gestures. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include an enhanced breadcrumbs module 16 that provides and supports enhanced visual navigation breadcrumbs, as disclosed herein. System 10 can be part of a larger system, such as a mapping system or a geographic information system. Therefore, system 10 will typically include one or more additional functional modules 18 to include the additional functionality. A database 17 is coupled to bus 12 to provide centralized storage for modules 16 and 18 and store the data underlying each enhanced breadcrumb, mapping information, attributes, etc.

Figure 2:
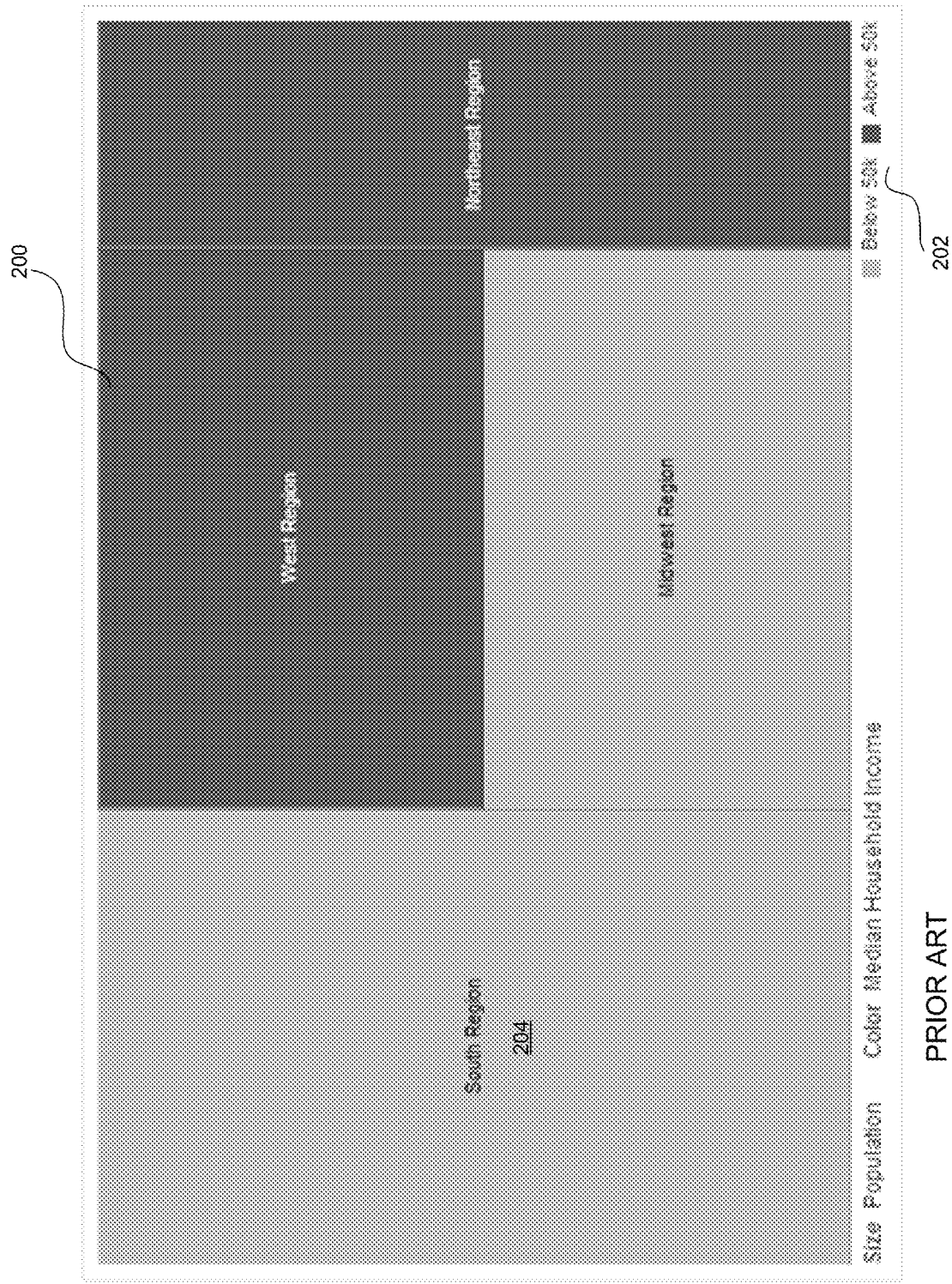
FIG. 2 illustrates a prior art treemap.

FIG. 2 illustrates a prior art treemap 200. A treemap displays hierarchical data as a set of nested rectangles. Treemap 200 shows the average household incomes for the United States by region. The treemap node color, as shown at 202, indicates whether that region's average income falls above or below $50,000 (i.e., an income attribute) and the size of the node correlates to the region's population (i.e., a population attribute). The color and size can be considered a "display scheme" for communicating attributes for a node.

Figure 3:
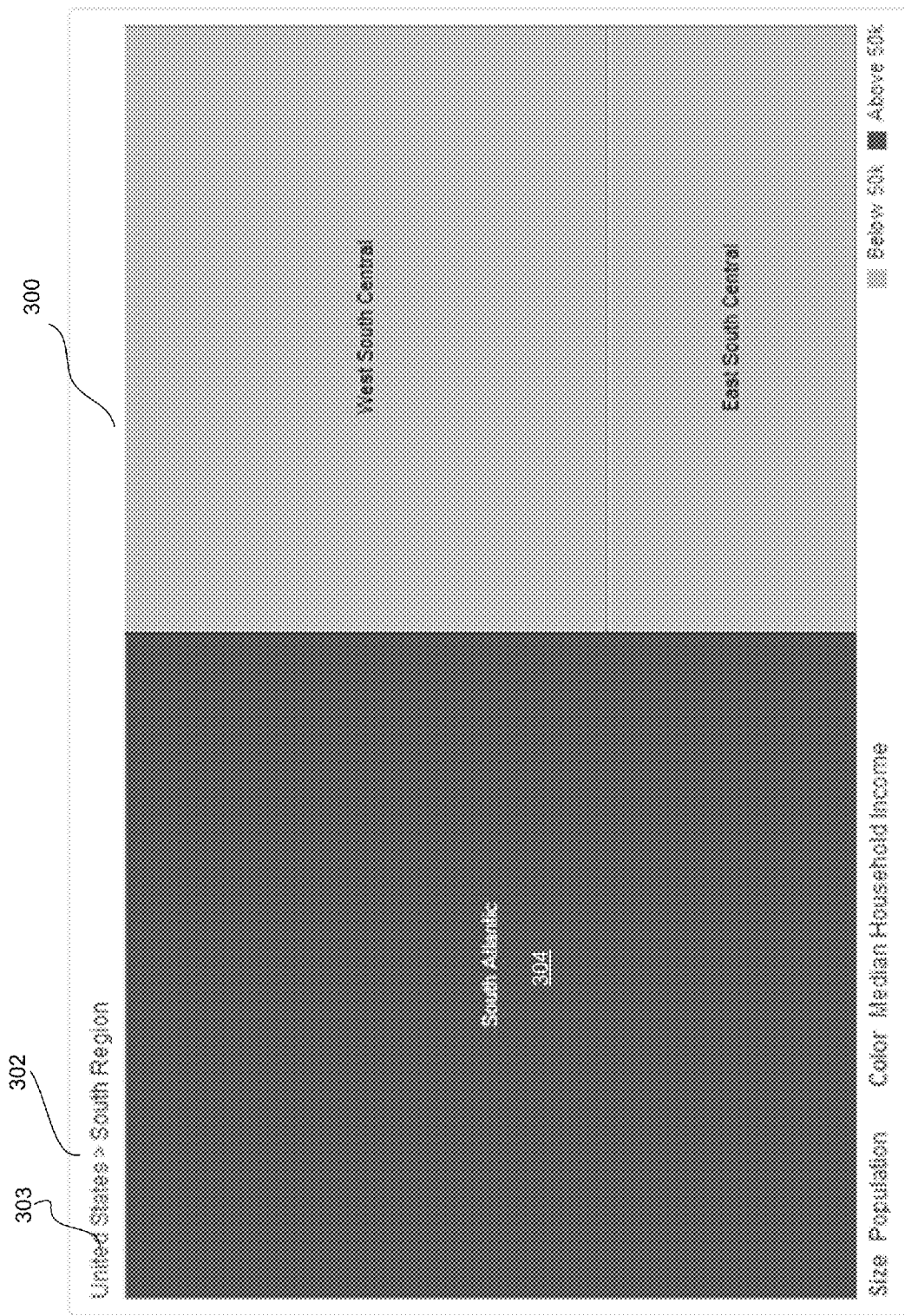
FIG. 3 illustrates a prior art treemap.

FIG. 3 illustrates a prior art treemap 300. Treemap 300 is the result of a user drilling down from a region of treemap 200 of FIG. 2. In FIG. 3, the user has drilled (i.e., selected) into the "South Region" node 204 of FIG. 2 by, for example, double clicking on South Region node 204. As a result, treemap 300 now shows income averages for regions within the South Region. Treemap 300 includes breadcrumbs 302 at the top of treemap 300 that allows the user to navigate back up to the previous view by clicking on the United States link 303.

Figure 4:
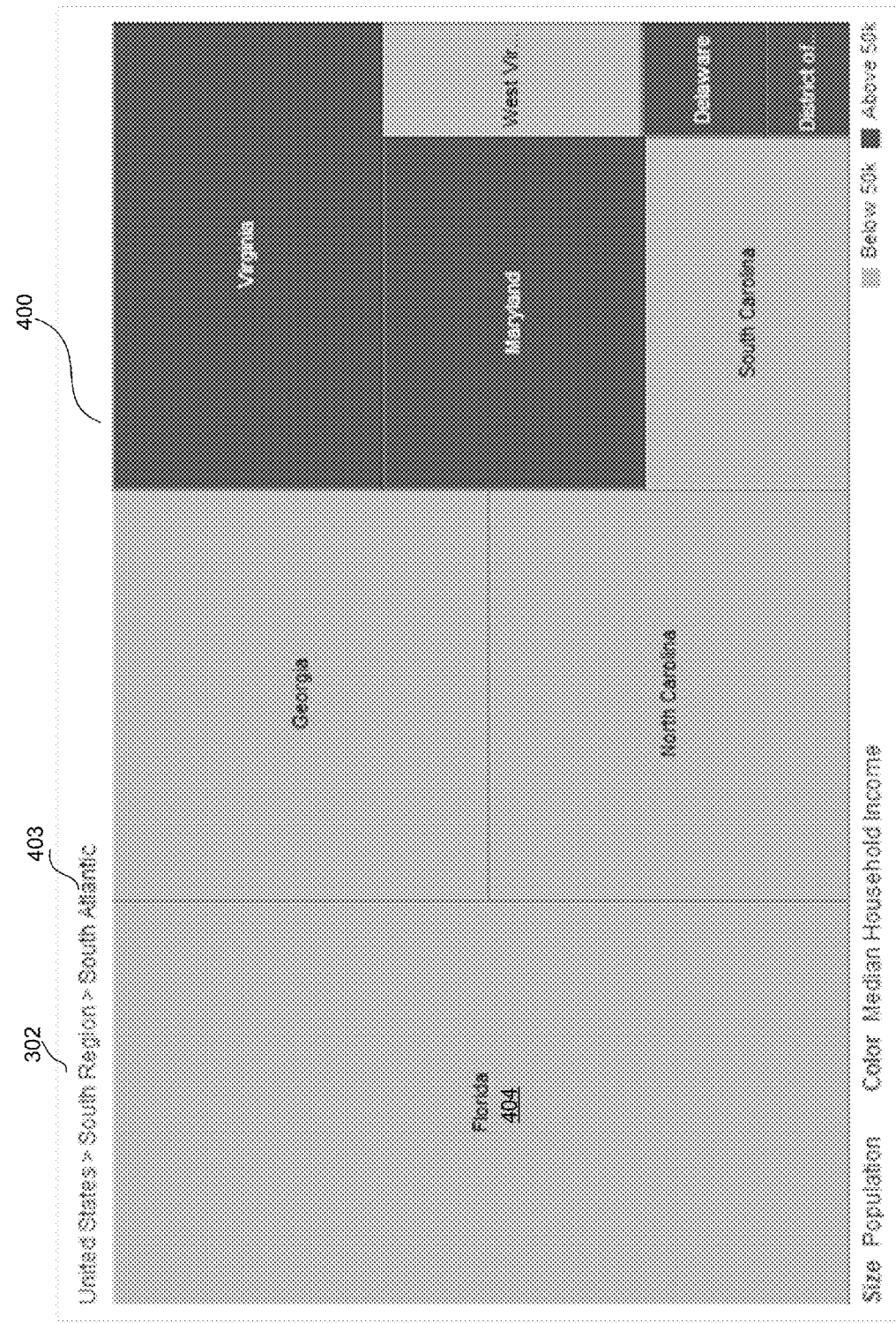
FIG. 4 illustrates a prior art treemap.

FIG. 4 illustrates a prior art treemap 400. Treemap 400 is the result of a user drilling down from a region of treemap 300 from FIG. 3. In FIG. 4, the user has drilled into the "South Atlantic" node 304 of FIG. 3 by, for example, double clicking on South Atlantic node 304. Breadcrumbs 302 now includes a "South Atlantic" link 403.

Figure 5:
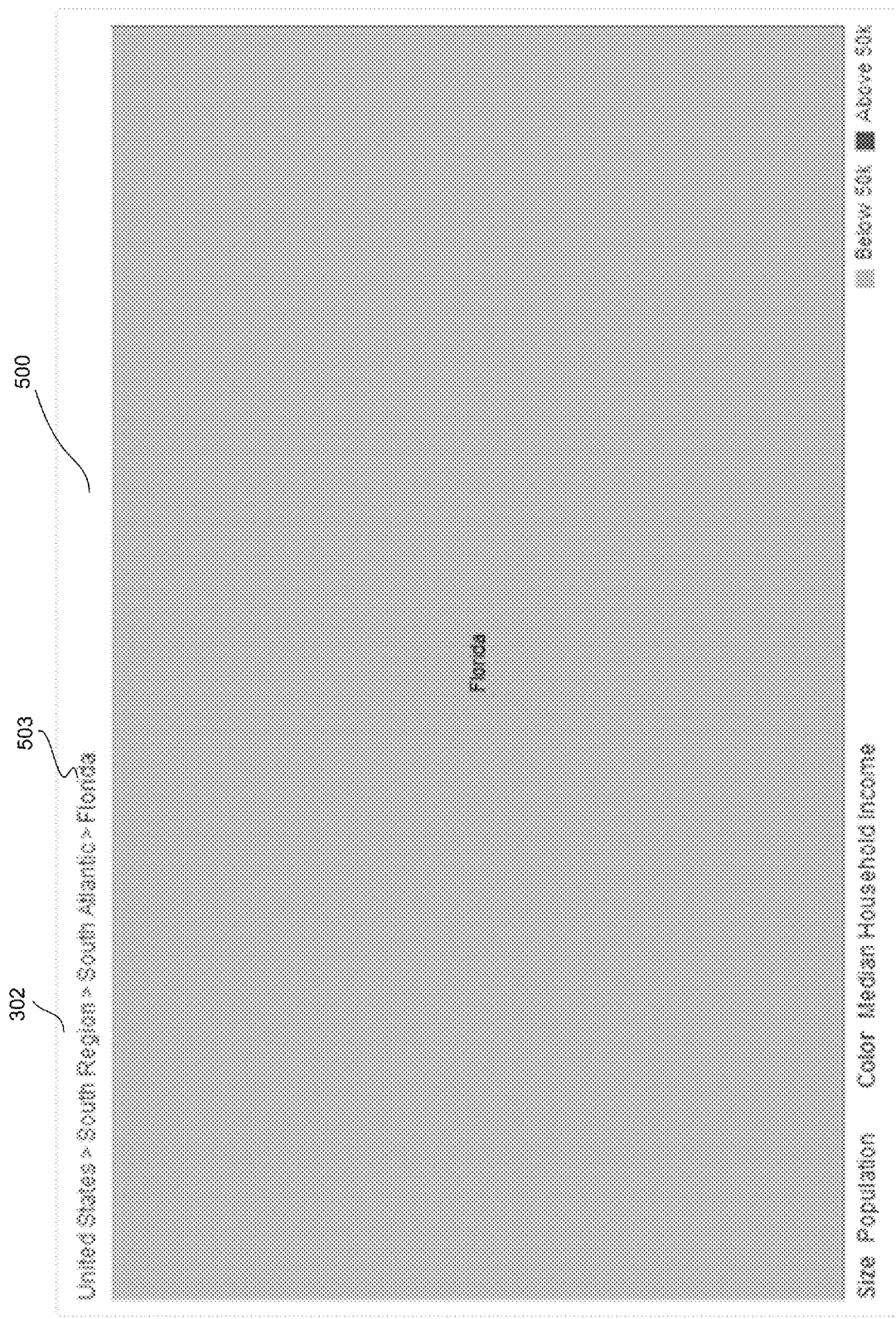
FIG. 5 illustrates a prior art treemap.

FIG. 5 illustrates a prior art treemap 500. Treemap 500 is the result of a user drilling down from a region of treemap 400 from FIG. 4. In FIG. 5, the user has drilled down into the "Florida" node 404 of FIG. 4 by, for example, double clicking on Florida node 404. Breadcrumbs 302 now includes a Florida link 503.

As shown in FIGS. 2-5, with the prior art treemaps and corresponding breadcrumbs, once a user drills to a next state, data associated with the parent state is lost. For example, once drilled into South Region node 204 of FIG. 2, the user no longer knows that the average household income for the collective regions of South Region 204 is below 50 k from looking at map 300 of FIG. 3. Maps that use color to represent a data dimension typically include textual breadcrumbs that are generally all one color, so that the color context of the drilled object is lost. Further, if data objects such as states of the United States were scaled by size in a map by a number attribute (e.g., the number of electoral votes in each state), the size context would be lost after drilling down using known textual breadcrumbs. Further, if drilling into a state in the Midwest to see, for example, voting data for Midwest counties, caused the rest of the map to fade and isolate on the drilled into state, the textual breadcrumbs allowing the end user to navigate back up to the state's map view would be unable to provide context that the state is located in the Midwest and the locational context would be lost.

In contrast, embodiments of the present invention provide enhanced visual navigation breadcrumbs to retain the information/attributes of previous hierarchical nodes. The enhanced breadcrumbs can retain data/attribute context such as size, color, and location after drilling into a previous hierarchical level. For color attributes, breadcrumb text nodes can be colored based on the drilled object's data color to retain color context. For size attributes, if the drilled object's size conveyed a data dimension such as representing a state's number of electoral votes, this information can be conveyed by scaling the breadcrumb text or showing it in a tooltip. Additional important context can be retained and displayed in tooltips, and the tooltips can also have a colored border to represent the color data in addition to or instead of coloring the breadcrumb text node.

Figure 6:
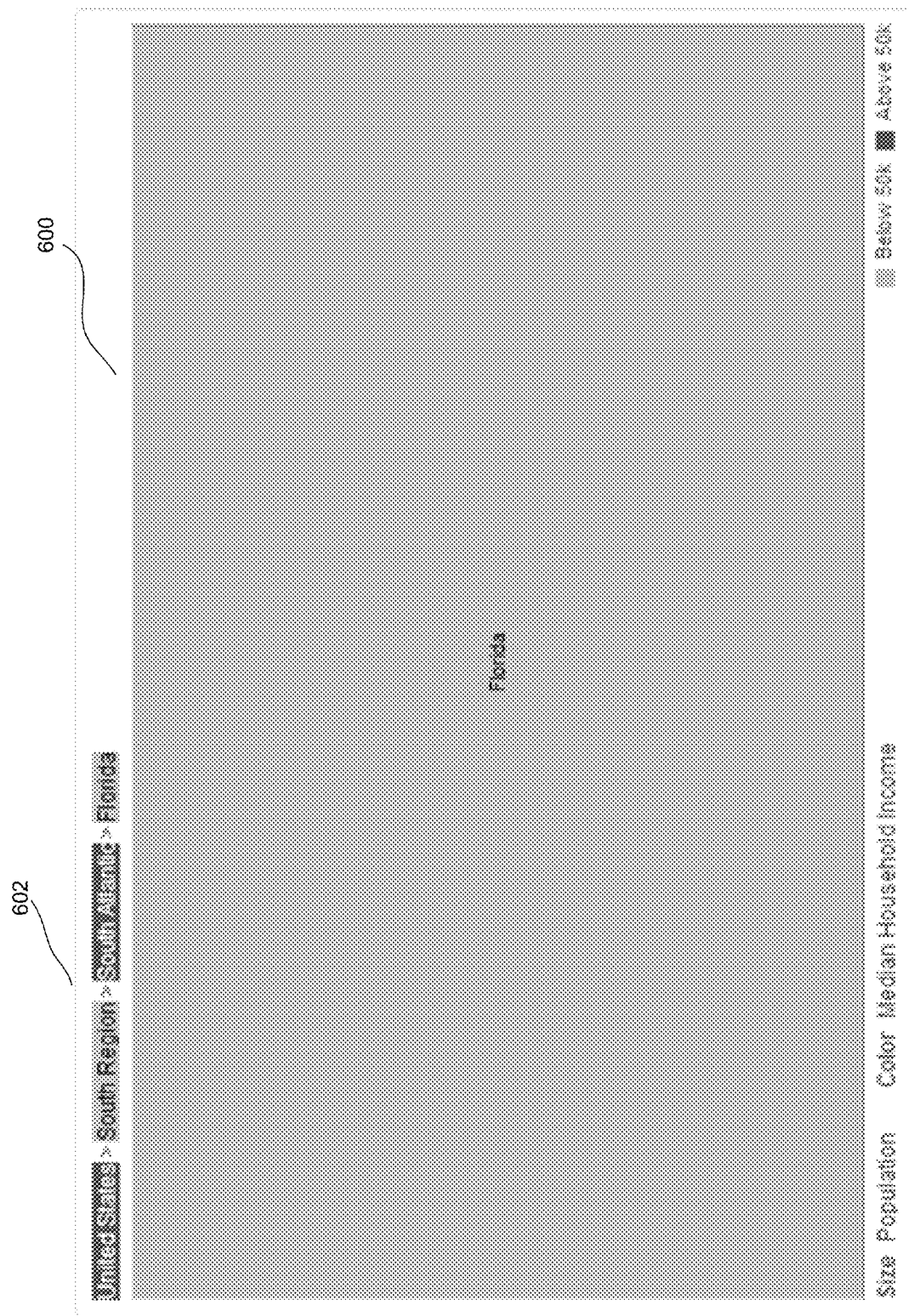
FIG. 6 illustrates a treemap with enhanced visual breadcrumbs in accordance with one embodiment of the invention.

Specifically, in one embodiment each breadcrumb is colored by the color of the treemap node link it represents. FIG. 6 illustrates a treemap 600 with enhanced visual breadcrumbs in accordance with one embodiment of the invention. FIG. 6 shows the same drilled down Florida node of FIG. 5. However, treemap 600 includes enhanced breadcrumbs 602. Each link of breadcrumbs 602 include an associated color of its corresponding node. Therefore, a user can quickly and easily determine the household income of all previous parent nodes, or any other associated attribute, by merely looking at enhanced breadcrumbs 602.

Figure 7:
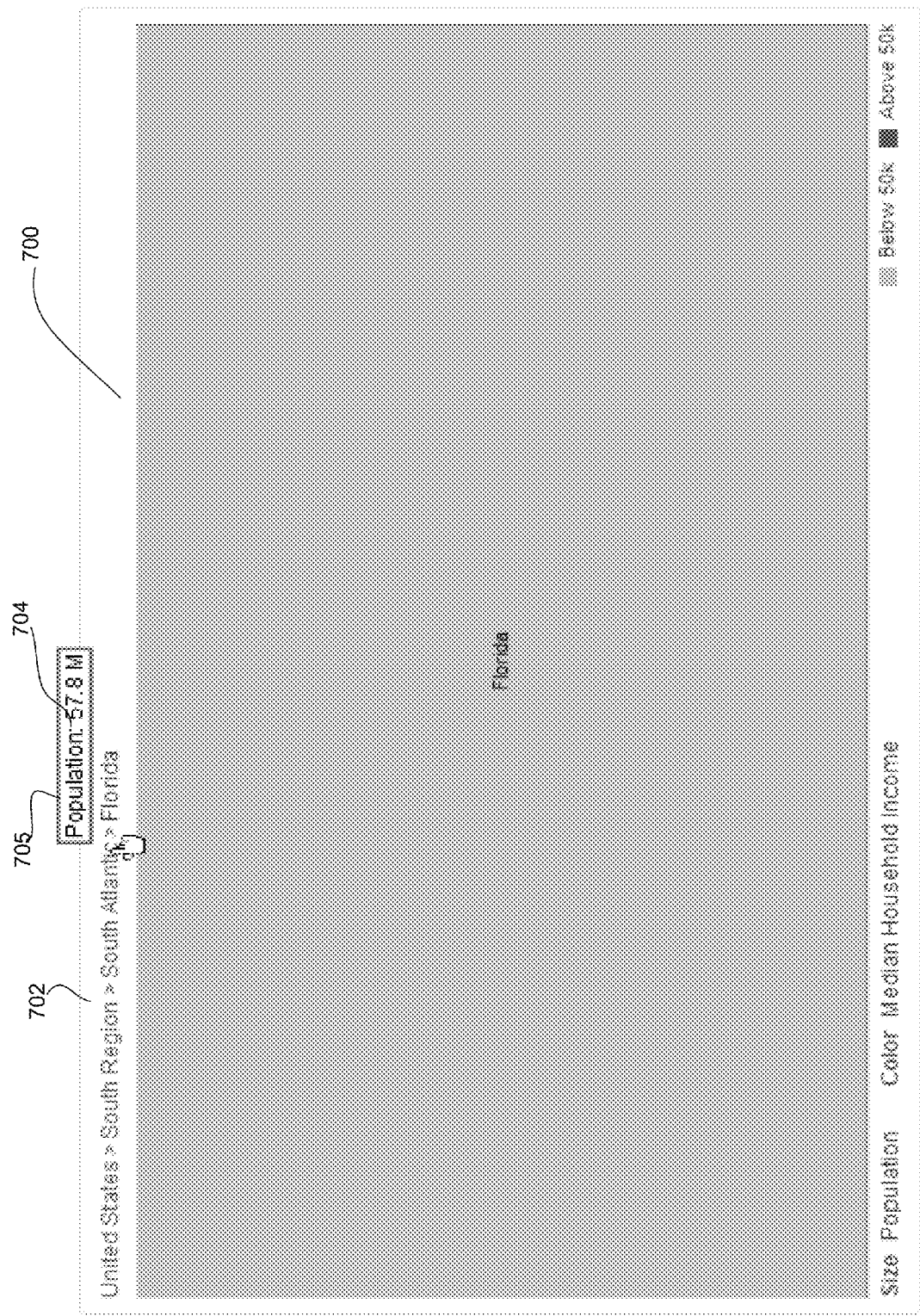
FIG. 7 illustrates a treemap with enhanced visual navigation breadcrumbs in accordance with another embodiment of the invention.

FIG. 7 illustrates a treemap 700 with enhanced visual navigation breadcrumbs in accordance with another embodiment of the invention. FIG. 7 shows the same drilled down Florida node of FIG. 5. However, treemap 700 includes enhanced breadcrumbs 702. Enhanced breadcrumbs 702 include tooltips to convey additional attributes that are not easily conveyed thru traditional text breadcrumbs. In one embodiment, the tooltips are generated when the user "hovers" over a link in the breadcrumbs. As shown in FIG. 7, a population value attribute for the parent "South Atlantic" region is conveyed in a tooltip 704. In addition, the income level color attribute can also be conveyed in tooltip 704 by coloring the border 705 of tooltip 704 using the corresponding color for the region.

Figure 8:
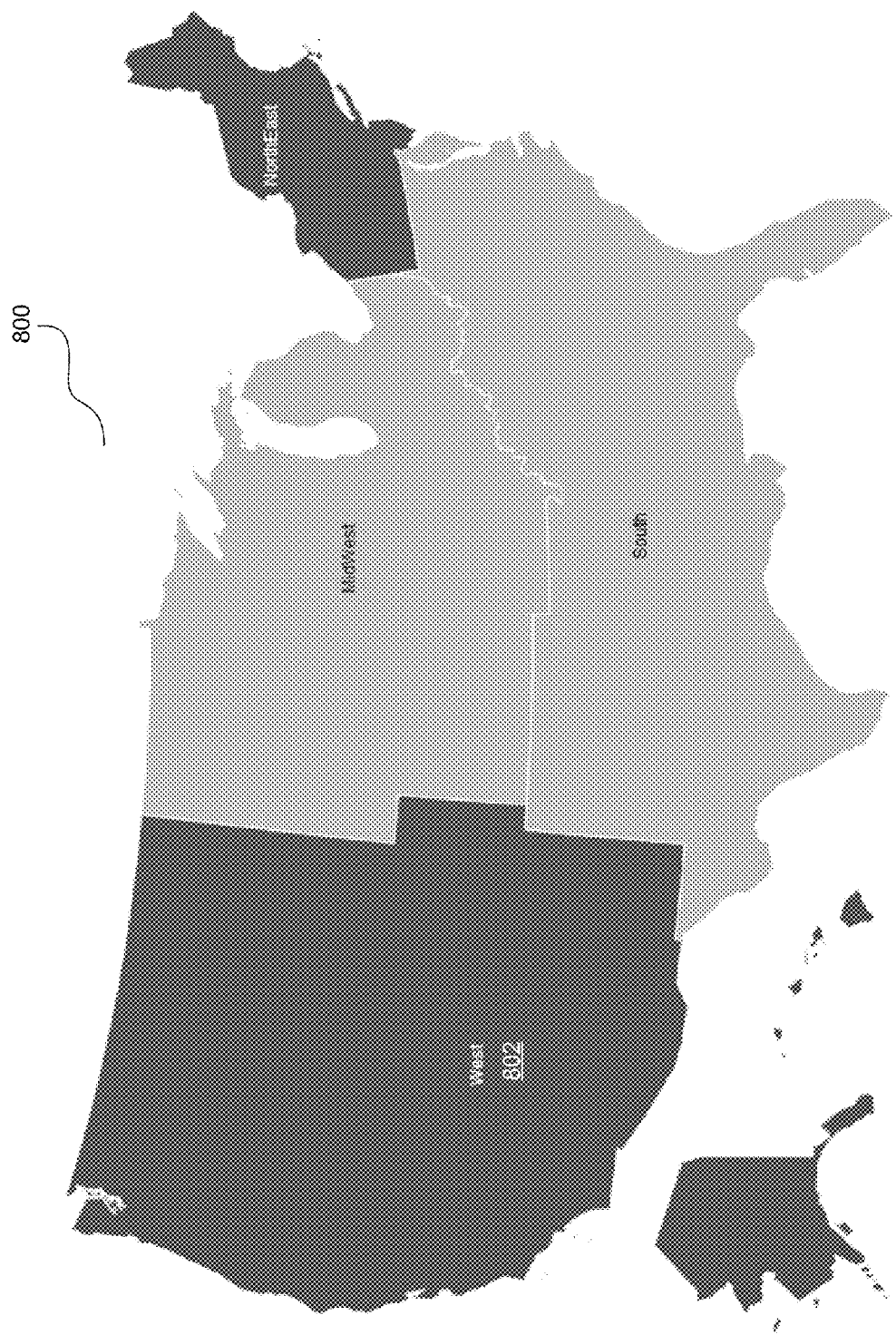
FIG. 8 illustrates a thematic map with enhanced visual navigation breadcrumbs in accordance with another embodiment of the invention.

In addition to treemaps, thematic maps are another type of data visualization that can show multiple levels of data with selection/drilling and the use of breadcrumbs. FIG. 8 illustrates a thematic map 800 with enhanced visual navigation breadcrumbs in accordance with another embodiment of the invention. Map 800 is a map of the United States divide by regions and uses the coloring scheme of FIG. 2 to indicate the average income of each region.

Figure 9:
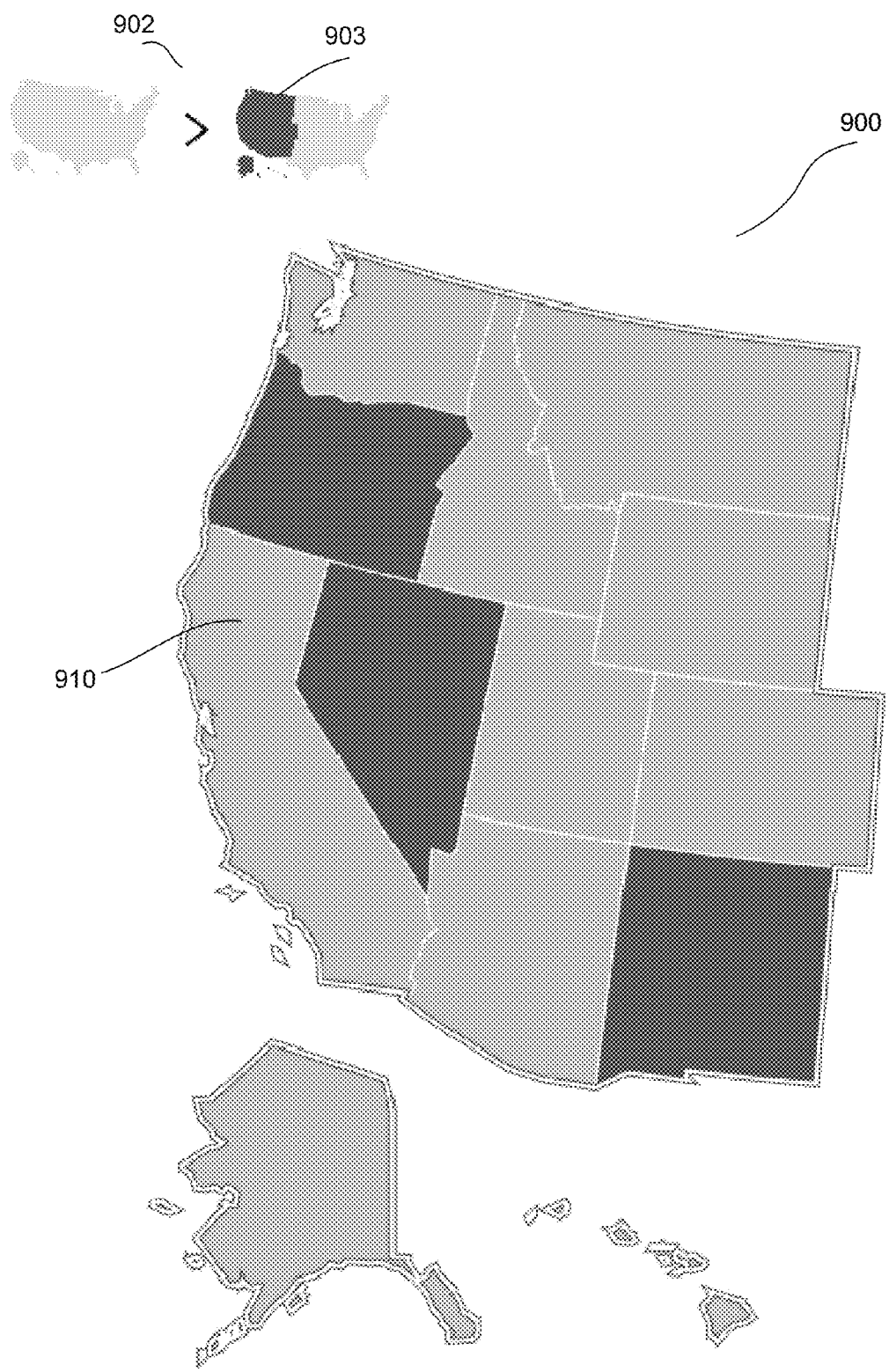
FIG. 9 illustrates a map with enhanced visual navigation breadcrumbs in accordance with an embodiment of the invention.

FIG. 9 illustrates a map 900 with enhanced visual navigation breadcrumbs in accordance with an embodiment of the invention. Map 900 is the result of map 800 of FIG. 8 after a user has drilled into/selected "West" region 802. The drilling down shows the average income levels by state. Visual breadcrumbs 902 at the top show a darkened area 903 that represents the drilled region 802 from FIG. 8 in order to show the relative location of the region of FIG. 9.

Figure 10:
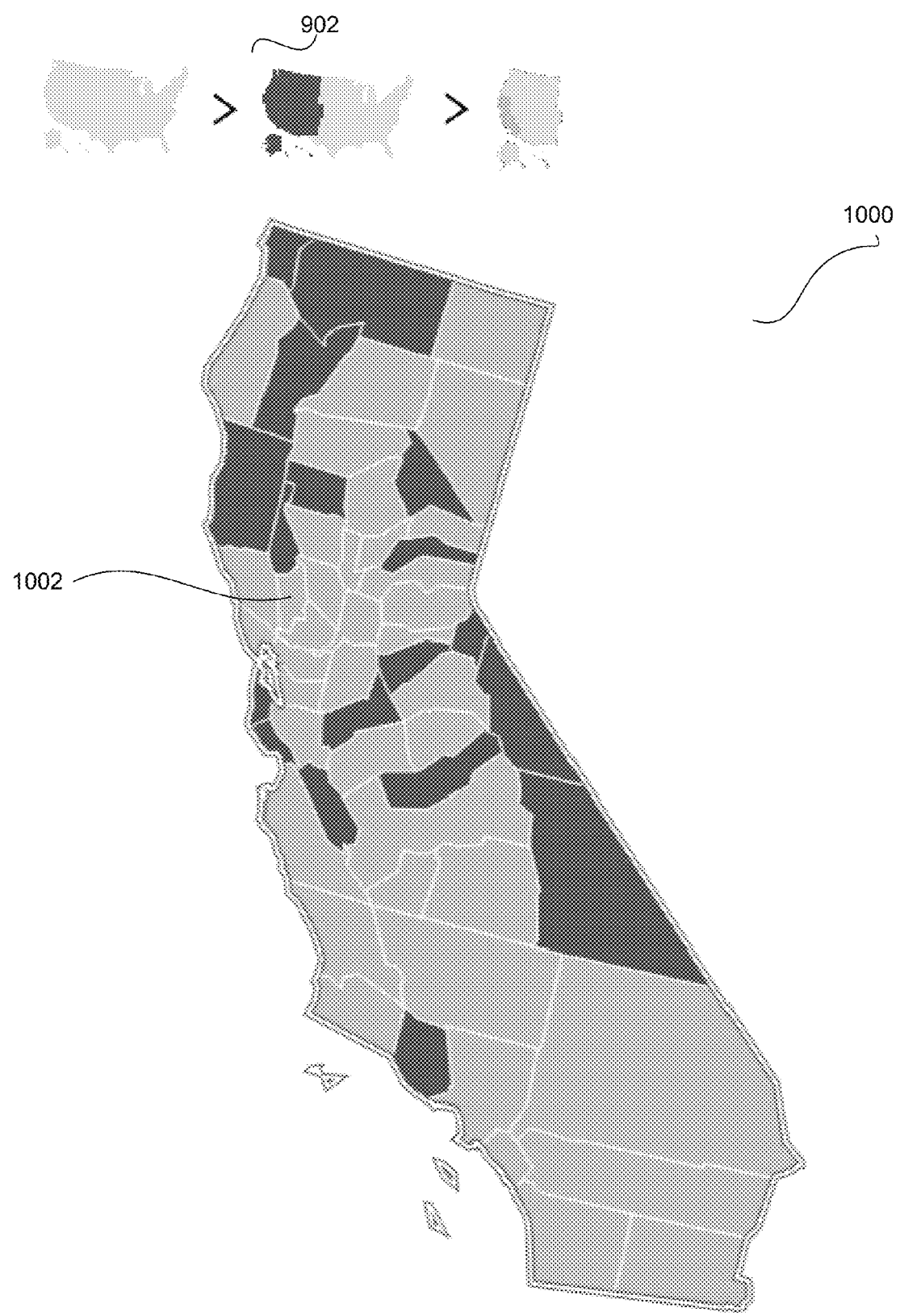
FIG. 10 illustrates a map with enhanced visual navigation breadcrumbs in accordance with an embodiment of the invention.

FIG. 10 illustrates a map 1000 with enhanced visual navigation breadcrumbs in accordance with an embodiment of the invention. Map 1000 is the result of map 900 of FIG. 9 after a user has drilled into/selected California region 910 of FIG. 9. Map 1000 shows the average income levels by county for the state of California. Visual breadcrumbs 902 at the top show the path back up through the parent region and its relative location within the parent region.

Figure 11:
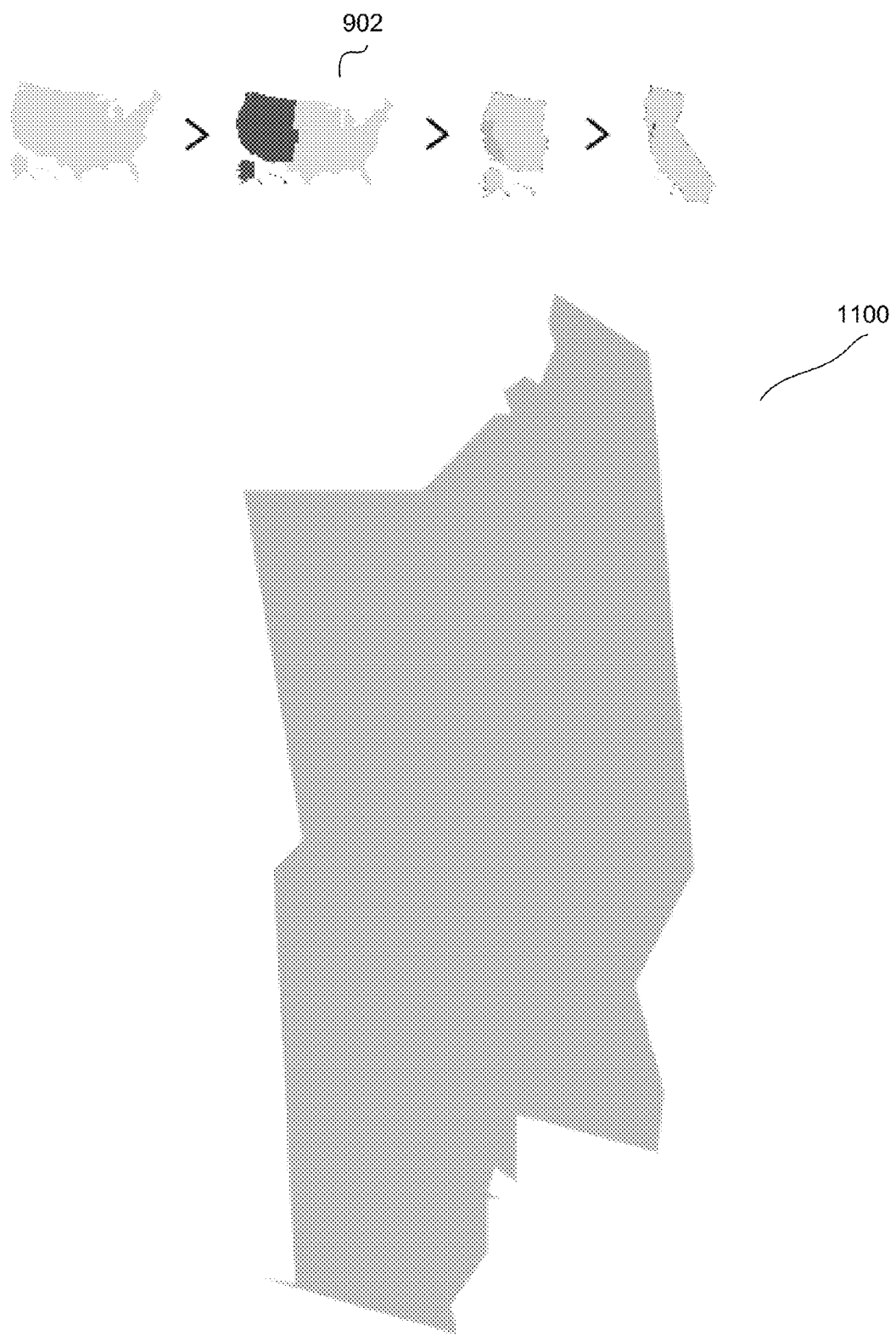
FIG. 11 illustrates a map with enhanced visual navigation breadcrumbs in accordance with an embodiment of the invention.

FIG. 11 illustrates a map 1100 with enhanced visual navigation breadcrumbs in accordance with an embodiment of the invention. Map 1100 is the result of map 1000 of FIG. 10 after a user has drilled into/selected Napa county 1002 of FIG. 10. Visual breadcrumbs 902 at the top show the path back up through the parent region and its relative location within the parent region.

Figure 12:
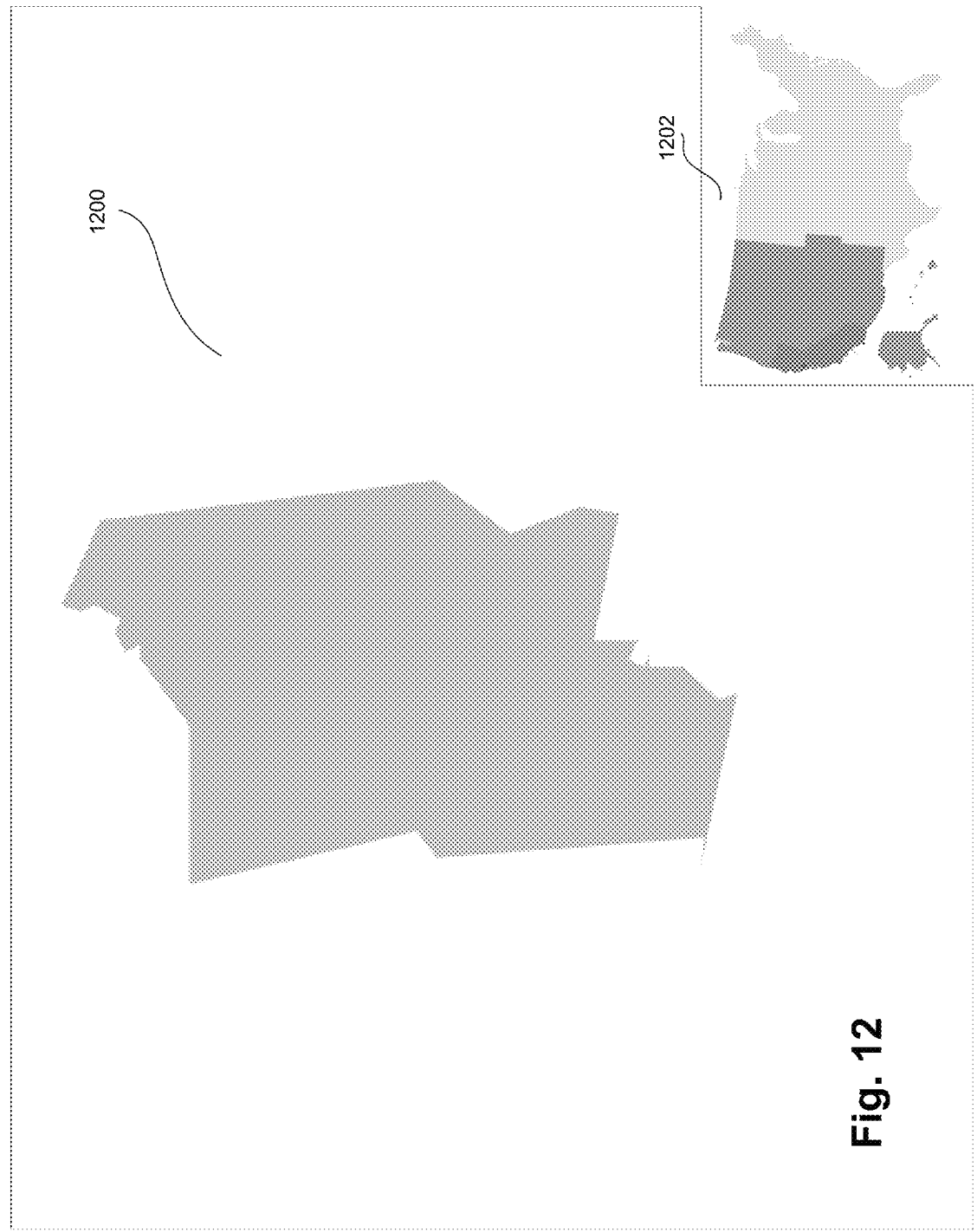
FIG. 12 illustrates a map with enhanced visual navigation breadcrumbs in accordance with an embodiment of the invention.

FIG. 12 illustrates a map 1200 with enhanced visual navigation breadcrumbs in accordance with an embodiment of the invention. Map 1200, similar to map 1100 of FIG. 11, is a map of Napa county 1002 of FIG. 10. However, map 1200 includes enhanced breadcrumbs 1202 that is formed by an overview window that uses opacity to indicate the path drilled through the parent regions.

The overview window can be created using a miniature version of the map with an opacity that is divisible by the number of data levels. For example, using state election data, a representation of the United States map can be shown at 50% opacity. Once drilled into a state such as California, a layer with the shape of California and another opacity at 50% would be added on top of the United States map so that that California would appear darker at 75% opacity (50% from the US map added with 50% (US map)×50% (California shape) where they overlap. The current drill depth would be represented by opacity, and the state's locational context would remain.

Figure 13:
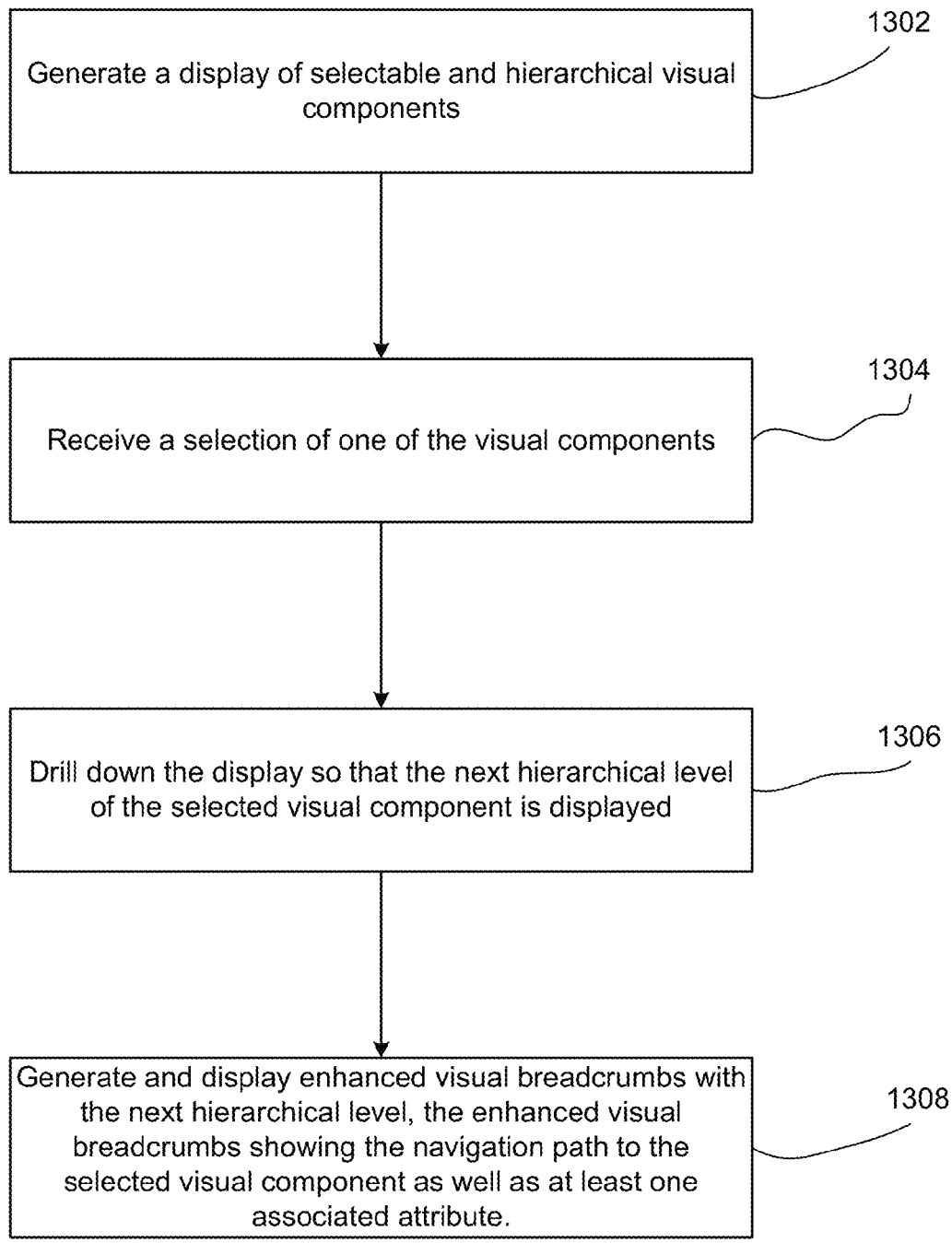
FIG. 13 is a flow diagram of an enhanced breadcrumbs module when providing enhanced visual navigation breadcrumbs in accordance with embodiments of the present invention.

FIG. 13 is a flow diagram of enhanced breadcrumbs module 16 when providing enhanced visual navigation breadcrumbs in accordance with embodiments of the present invention. In one embodiment, the functionality of the flow diagram of FIG. 13 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1302, a display of selectable and hierarchical visual components is generated. Each visual component includes at least one corresponding data/attribute that can be displayed using a display scheme. For example, the visual components can be regions within a map of the United States, with an attribute such as total population associated with each region. The display of the attributes may be in the form of a coloring scheme such as shown in FIG. 8, or a size/scaling scheme. Other examples of attributes include the location of the visual component relative to the rest of the visual components (e.g., the location of a county within a state), income levels, registered voters, etc. The display of the visual components may encompass a map, and the map may be a treemap.

At 1304, one of the visual components are selected.

At 1306, the display is drilled down so that the next hierarchical level of the selected visual component is displayed. For example, if the visual component is a state, the next displayed level could be the counties for that state.

At 1308, enhanced visual breadcrumbs are generated and displayed with the next hierarchical level. The enhanced visual breadcrumbs show the navigation path to the selected visual component as well as at least one associated attribute. For example, the enhanced breadcrumbs can show an attribute via the displayed color by coloring each breadcrumb, as shown in FIG. 6, or a tooltip can be associated with each breadcrumb, as shown in FIG. 7.

As disclosed, embodiments provide enhanced visual navigation breadcrumbs, each of which can convey the same data as its visual counterpart. The enhanced breadcrumbs improve the user's interactive experience by giving them the information they need up front instead of requiring the user to drill back up to the parent to get the same information.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to provide visual components, the providing comprising:
   generating a first display of selectable and hierarchical visual components, each visual component having at least one associated attribute including location;
   in response to receiving a selection of one of the visual components, displaying a second display of visual components at a next hierarchical level of the selected visual component; and
   generating and displaying, in an overview window, breadcrumbs comprising a navigation path from the first display to the second display, the overview window using opacity to highlight the associated attribute within an overall map.

2. The non-transitory computer-readable medium of claim 1, wherein each visual component has an associated display scheme of the attribute, and wherein the breadcrumbs comprise the associated display scheme for displaying the associated attribute for the selected visual component.

3. The non-transitory computer-readable medium of claim 1, where the first display is a map, and the visual components are regions of the map.

4. The non-transitory computer-readable medium of claim 1, wherein the associated attribute includes color.

5. The non-transitory computer-readable medium of claim 1, wherein the breadcrumbs comprise a map showing a relative location of the selected visual component as the associated attribute.

6. The non-transitory computer-readable medium of claim 1, wherein the opacity is divisible by a total number of hierarchical levels.

7. A method of providing visual components, executed by a processor, the method comprising:
   generating a first display of selectable and hierarchical visual components, each visual component having at least one associated attribute including location;
   in response to receiving a selection of one of the visual components, displaying a second display of visual components at a next hierarchical level of the selected visual component; and
   generating and displaying, in an overview window, breadcrumbs comprising a navigation path from the first display to the second display, the overview window using opacity to highlight the associated attribute within an overall map.

8. The method of claim 7, wherein each visual component has an associated display scheme of the attribute, and wherein the breadcrumbs comprise the associated display scheme for displaying the associated attribute for the selected visual component.

9. The method of claim 7, where the first display is a map, and the visual components are regions of the map.

10. The method of claim 7, wherein the associated attribute includes color.

11. The method of claim 7, wherein the breadcrumbs comprise a map showing a relative location of the selected visual component as the associated attribute.

12. The method of claim 7, wherein the opacity is divisible by a total number of hierarchical levels.

13. A visual component display system comprising:
   a processor;
   a database coupled to the processor;
   a display coupled to the processor; and
   a storage device coupled to the processor and storing an enhanced breadcrumbs module;
   wherein the enhanced breadcrumbs module, when executed by the processor,
      generates a first display of selectable and hierarchical visual components, each visual component having at least one associated attribute including location;
      in response to receiving a selection of one of the visual components, displays on the display a second display of visual components at a next hierarchical level of the selected visual component; and
      generates and displays, in an overview window on the display, breadcrumbs comprising a navigation path from the first display to the second display, the overview window using opacity to highlight the associated attribute within an overall map.

14. The visual component display system of claim 13, where the first display is a map, and the visual components are regions of the map.

15. The visual component display system of claim 13, wherein the associated attribute includes color.

16. The visual component display system of claim 13, wherein the breadcrumbs comprise a map showing a relative location of the selected visual component as the associated attribute.

17. The visual component display system of claim 13, wherein the opacity is divisible by a total number of hierarchical levels.

* * * * *

UNITED STATES PATENT AND TRADEMARK OFFICE
CERTIFICATE OF CORRECTION

PATENT NO.        : 9,535,584 B2
APPLICATION NO.   : 14/300419
DATED             : January 3, 2017
INVENTOR(S)       : Dai et al.

Page 1 of 1

It is certified that error appears in the above-identified patent and that said Letters Patent is hereby corrected as shown below:

In the Specification

In Column 4, Lines 65-66, delete "that that" and insert -- that --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*